INVENTORS
JOHANNES HEIDENHAIN
ARTHUR BRUNNER

BY Ernest G. Montague

ATTORNEY.

March 3, 1970     J. HEIDENHAIN ET AL     3,498,254
SUPPORTING DEVICE FOR DISCS CARRYING A DIVISION
Filed April 19, 1966     2 Sheets-Sheet 2

INVENTORS
JOHANNES HEIDENHAIN
ARTHUR BRUNNER
BY

ATTORNEY.

United States Patent Office 3,498,254
Patented Mar. 3, 1970

3,498,254
SUPPORTING DEVICE FOR DISCS CARRYING A DIVISION
Johannes Heidenhain, Egerer, near Chieming, and Arthur Brunner, Trostberg, Germany, assignors to Wenczler & Heidenhain, Traunreut, Germany, a corporation of Germany
Filed Apr. 19, 1966, Ser. No. 543,752
Claims priority, application Germany, Apr. 24, 1965, W 39,041
Int. Cl. G09f 9/00
U.S. Cl. 116—129
6 Claims

ABSTRACT OF THE DISCLOSURE

A supporting device for discs carrying a division in digital electric angle measuring devices, which comprises a housing and a first disc rotatably mounted in the housing and carrying a division. An annular socket means supports the first disc and a second disc is rotatably mounted in the housing parallel to and spaced apart from the first disc and carries a pattern of the division of the first disc. An axle is rotatable in the housing and has a collar, and the annular socket is secured to the axle for joint rotation therewith. Roller bearings surround the axle and engage operatively the collar of the axle. A ring is secured to the roller bearings and supports the second disc thereto. The axle, the first disc, the second disc and the bearings constitute a unitary structural group independent from the housing.

---

The present invention relates to a supporting device for disks carrying a division, in general, and to a supporting device by means of which disks are supported in the housing of an angular measuring device, for non-engaging disks with light-electrical sensing, which disks supported in a socket and disposed above the other on a common axis, in particular.

Arrangements of this type are known, which have the drawback, that in case of temperature variations the disks disposed on the axle of the device are subjected to a change of position relative to the sensing member secured to the housing, which leads to wrong results of the measuring operation.

A further drawback of these known arrangements resides in the fact that the mounting of the disk carrying the division in the housing, in particular, in the case of crowded space conditions, is difficult and also time consuming.

It is, therefore, one object of the present invention to provide a supporting device for disks carrying a division which avoids the drawbacks of the known structures and which renders the measuring values obtained by the device as much as possible independently from temperature variations, and which, in addition, simplifies the mounting of the device.

It is another object of the present invention to provide a supporting device for disks carrying a division, wherein the elements, namely the axle, the disk carrying a division, the sensing member, the axial bearing and a ring surrounding the axial bearing constitute a closed structural group disposed independently in the housing.

With these and other objects in view which will become apparent in the following detailed description, the present invention will be clearly understood in connection with the accompanying drawings, in which.

Figure 1:
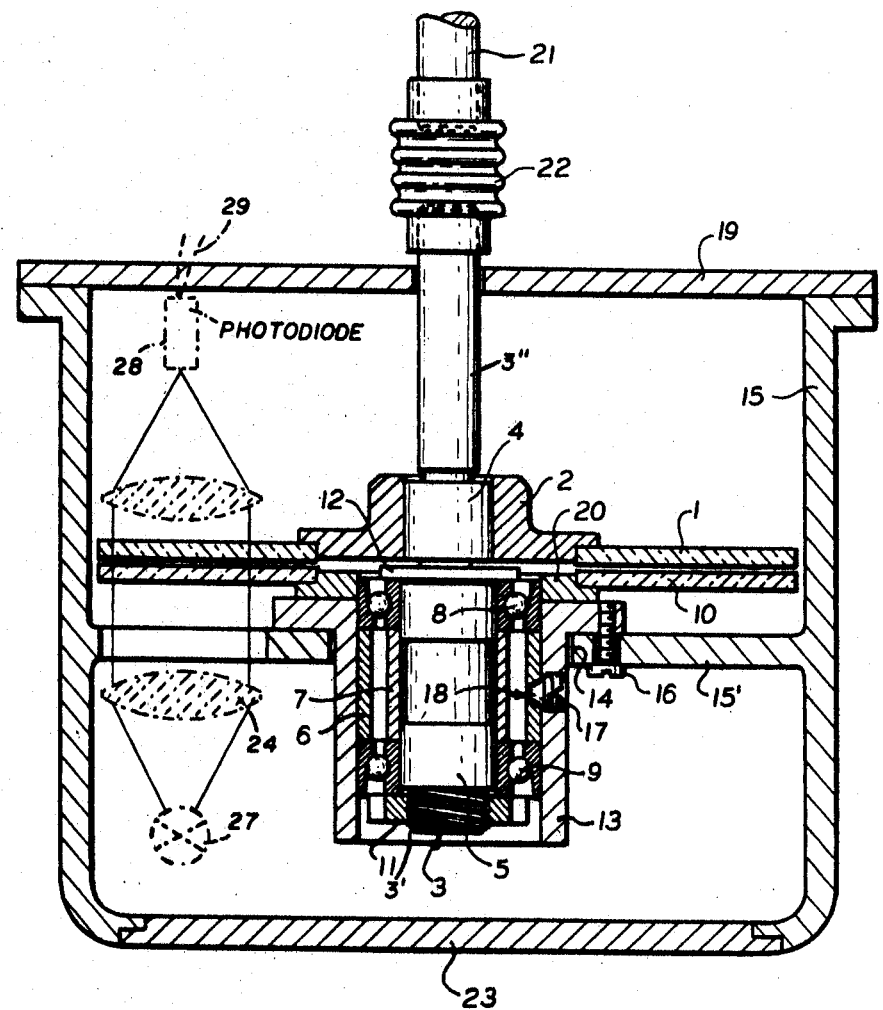
FIGURE 1 is an axial section of the device designed in accordance with the present invention.
Figure 4:
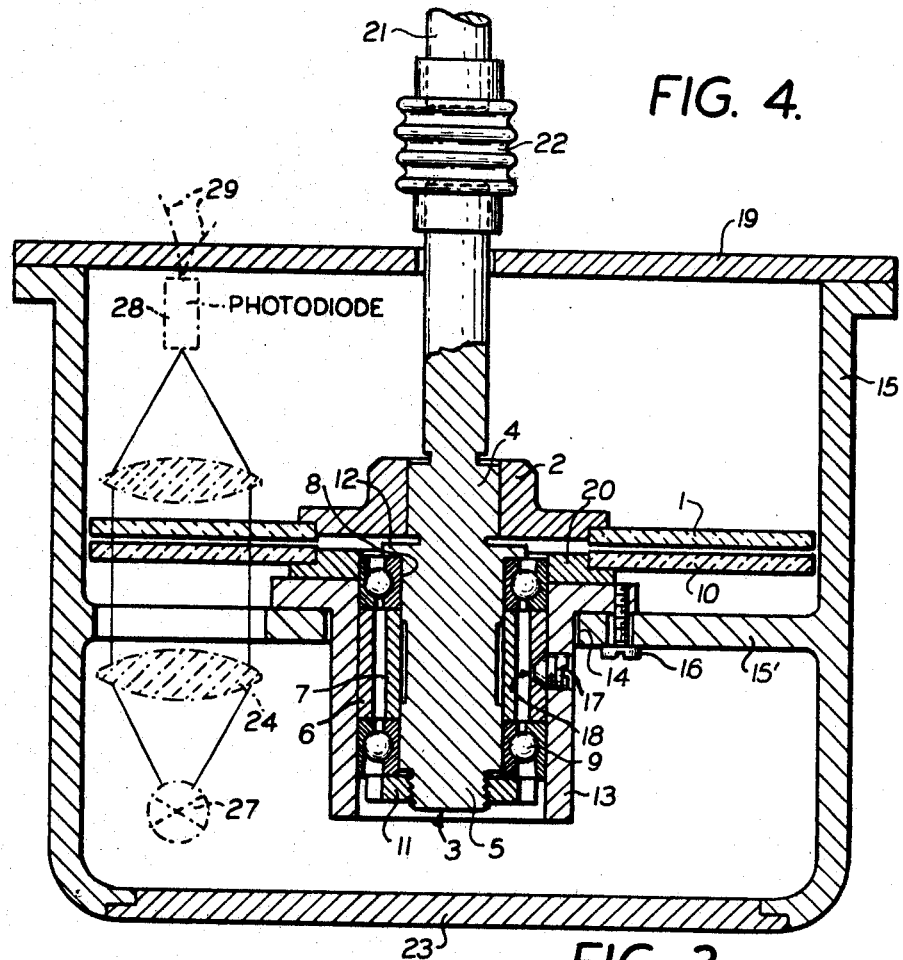
FIG. 4 is an axial section of the device shown in FIG. 1, the shaft being shown in section.
Figures 2, 3:
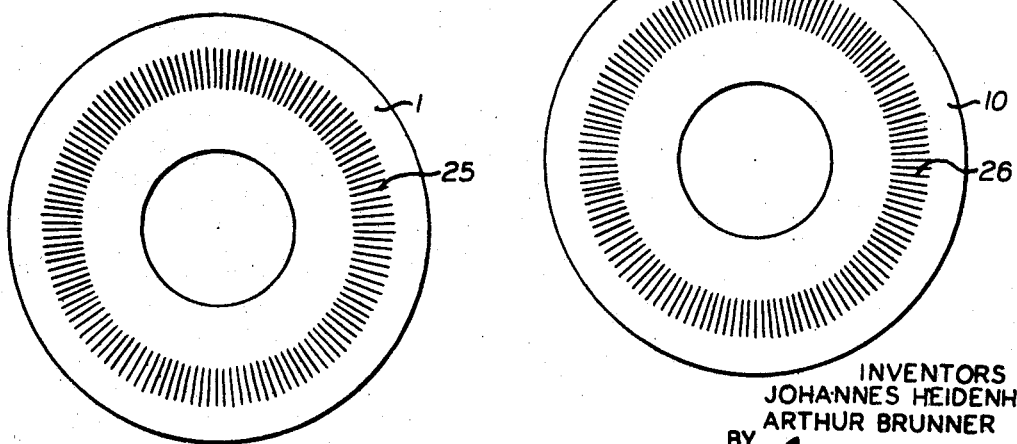
FIG. 2 is a top plan view of one disk carrying one of the divisions.
FIG. 3 is a top plan view of the other disk carrying the other of the divisions.

Referring now to the drawings, the device comprises an annular disk 1 made of transparent material as glass or plastic and carrying a division 25 (FIG. 2), which disk 1 is supported by an annular socket 2 and it is rigidly connected therewith by means of cementing.

The division 25 is applied to the disk 1 in an advantageous manner, for instance, in a photomechanical contact copying process.

The copying device (not shown) consists in this case of a pattern corresponding with the desired division and a receiving member centered on the pattern, as well as immovably secured thereto.

The supported disk, which is equipped with a light-sensitive layer on the face carrying the division, is brought over the receiving member of the copying device in direct contact with the face carrying the division of the pattern and the further copying process is performed in conventional manner.

The diameter of the receiving member of the copying device (not shown) is dimensioned such, that it corresponds exactly with the diameter of the axial pin portion 4 of the axle 3 of the device, on which the disk 1 carrying the division applied in the manner described above, is mounted by means of its annular socket 2. By the above described structure of the copying device used for the production of the division any adjustment of the disk carrying division relative to the axle portion 4 is eliminated. The annular disk 1 is rigidly connected with the axle portion 4 by means of cementing the annular disk 1 to the annular socket 2.

On the other axle portion 5 of the axle 3 of the device, which axle 3 has shoulders on both sides, is mounted a bearing, which in the shown embodiment is formed in an advantageous manner by means of two pretensionable roller bearings 8 and 9 separated from each other by means of spacing sleeves 6 and 7 to separate inner races and outer races of the roller bearings, respectively and 9 directly next to each other on the axle 3.

The ball bearings 8 and 9 are thereby pretensioned in axial direction relative to a collar 12 preferably integral with the axle 3, by means of a nut 11, which is screwed to a threaded extension 3' of the axle portion 5.

A tubular member 13 having an annular flange 13' surrounds the bearings 8 and 9, which tubular member 13 having an annular flange 13' is fitted to the outer ring of the roller bearings 8 and 9.

Furthermore, a sensing member 10, which in the embodiment shown by example constitutes a sensing disk for light-electric sensing is provided, which sensing disk 10 is secured to an annular ring 20 and disposed at a small distance from the disk 1. The annular ring 20 is fixed to the outer race of the roller bearing 8.

The sensing disk 10 is mounted by means of the annular ring 20 to the outer race of the roller bearing 8, as well as on the tubular member 13 opposite the disk 1 by means of screws (not shown) non-rotatably. The sensing disk 10 is rigidly secured on the annular ring 20 by means of cementing.

On the sensing disk 10 is provided on the side, facing the disk 1, a division 26 in a manner indicated and explained in connection with the disk 1.

The diameter of any receiving member of the copying machine (not shown) suitable for the purpose of the present invention is dimensioned again such, that it corresponds exactly to the diameter of the outer ring 6 of the ball bearing 8 on which the sensing disk 10 is mounted by means of its frame 20.

In the embodiment of the present invention the disk 1, used for the measuring and setting of angles, is divided into a radial grid, whereby the grid arrangement is done in a known manner such, that each path element consists each of a transparent and a nontransparent partial field. The division 26 of the sensing disk 10 is designed such, that it is identical with the division 25 of the disk 1. If the measuring task requires also the consideration of the direction of movement, then, in the simplest case, two relatively set-off divisions, which are identical with the division 25 of the disk 1, are provided on the sensing disk 10. Due to the set-off of the division 26 on the sensing disk 10, the signals delivered from a photodiode are phase shifted. The signals are transformed in known electronic elements into rectangular pulses and are used thus as a criterion for the recognition of the direction and as counting pulses.

In such arrangements, a constant phase position of the signal is a presumption for the correct measuring. In case of different expansions of the disk 1, and of the sensing disk 10, the phase angle of the signals would change.

Since in the supporting device, in accordance with the present invention, the elements, namely the axle 3, the annular socket 2 and the ring 20, axle bearings 8 and 9 and the tubular member 13 are made of a material corresponding to the coefficient of heat expansion of the disks 1 and 10 and furthermore, since they constitute a combined structural group independent from the housing 15, the disks 1 and 10 will experience the same expansion in case of temperature changes, which does not cause a variation of the phase angle and thus permits a completely correct measuring.

Since the disk 1 carrying the division 25, the bearings 8 and 9 and the tubular member 13 surrounding the roller bearings 8 and 9, as well as the sensing disk 10 are mounted on the axle 3, the combined structural group is inserted by means of tubular member 13 into an opening 14 of a cross wall 15' of the housing 15 and is secured therein, by means of screws 16 extending through the cross wall 15' and projecting through a flange portion 13' of the ring 13. A screw 17, having a conical projection, enters into a bore 18 of the outer spacing sleeve 6. Closures 19 and 23 are also provided which seal-off dust-tight the housing 15.

The elements required for the light-electric sensing, as well as the illumination device, the lens 24, photodiode 28, terminals 29 of the latter and other electronic constructral elements as the light source 27 are provided in the housing 15, in the shown embodiment, in a manner known per se. A possible arrangement is schematically shown in the drawing in dotted lines. The axle portion 3" of the axle 3 is connected for driving connection with drive shaft 21 by means of a metal bellows 22, which has a high rotary power, but only slight bending stiffness, whereby loads are avoided on the sensitive precision bearings 8 and 9 to a great extent.

It is to be understood that the present invention is not only limited to the described embodiment with non-engaging light-electrical sensing. The invention could also be applied, for instance, to theodolites, in which the disk carrying the division is sensed by means of an optically imaging system relative to an index, whereby the optical system, as well as the index is provided on the ring surrounding the axle bearing, which ring is immovable relative to the disk carrying the division.

It is also possible to apply the supporting device in accordance with the present invention in angular measuring devices with capacitive, inductive and magnetic sensing.

While I have disclosed one embodiment of the present invention, it is to be understood that this embodiment is given by example only and not in a limiting sense, the scope of the present invention being determined by the objects and the claims.

We claim:
1. A supporting device for disks carrying a division in digital electric angle measuring devices comprising:
a housing,
a first disk rotatably mounted within and relative to said housing and carrying divisions,
an axle rotatable in said housing,
an annular socket means supporting said first disk and being secured to said axle for joint rotation therewith,
a second disk mounted within said housing parallel to and spaced apart from said first disk and carrying a pattern of the division of said first disk,
bearing means and a tubular member,
said tubular member surrounding said bearing means and supporting and securing non-rotatably said second disk thereto, and
said axle, said first disk, said second disk and said bearing means constituting a connected structural group independent from said housing.

2. The device, as set forth in claim 1, wherein:
said axle is the carrier of said first disk, of said bearings, as well as by means of the latter of said ring and of said second disk.

3. The device, as set forth in claim 1, wherein:
said axle, said annular socket means, said ring are of a material having a heat expansion coefficient equal with that of said first and second disks.

4. The device, as set forth in claim 1, wherein:
said axle is set off at its opposite ends and forms axle pins,
one of said axle pins has secured thereto said first disk by means of said annular socket means,
the other of said axle pins has secured thereto said bearing means carrying said securing disk,
two spacing sleeves disposed between said two bearing means,
means for pretensioning said bearing means in axial direction, and
said bearing means being disposed adjacent each other.

5. The device, as set forth in claim 4, wherein:
said second disk is spaced apart from said first disk at a predetermined distance,
said second disk is mounted by means of said ring on said bearing means as well as on said annular flange opposite said first disk non-rotatably, and
means for cementing said first disk to said annular socket means and said second disk to said second frame.

6. The device, as set forth in claim 1, wherein:
said outer ring is disposed in a bore of said housing, and
screws entering said outer ring and securing the latter in said housing.

References Cited

UNITED STATES PATENTS

| | | | |
|---|---|---|---|
| 2,656,818 | 10/1953 | Moore | 33—174 |
| 2,945,167 | 7/1960 | Gunther. | |
| 3,111,841 | 11/1963 | Gray | 116—114 XR |
| 3,135,903 | 6/1964 | Tomek. | |
| 3,187,187 | 6/1965 | Wingate | 88—14 XR |
| 3,234,394 | 2/1966 | Worden | 250—231 XR |
| 3,317,739 | 5/1967 | Larraburu et al. | 88—14 |
| 3,326,077 | 6/1967 | Vandermeer | 88—14 |
| 3,172,677 | 3/1965 | Marker | 280—11.35 |
| 3,186,727 | 6/1965 | Hatlapa | 280—11.35 |
| 3,191,955 | 6/1965 | Preisig | 280—11.35 |
| 3,337,225 | 8/1967 | Smolka et al. | 280—11.35 |
| 3,351,354 | 11/1967 | Smolka et al. | 280—11.35 |

LOUIS J. CAPOZI, Primary Examiner